(12) United States Patent
Wood et al.

(10) Patent No.: US 10,397,121 B2
(45) Date of Patent: *Aug. 27, 2019

(54) SYSTEM AND METHOD FOR THROTTLING TRAFFIC BASED ON A FORWARDING INFORMATION BASE IN A CONTENT CENTRIC NETWORK

(71) Applicant: Cisco Technology, Inc., San Jose, CA (US)

(72) Inventors: Christopher A. Wood, San Francisco, CA (US); Glenn C. Scott, Portola Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/046,019

(22) Filed: Jul. 26, 2018

(65) Prior Publication Data

US 2018/0337857 A1 Nov. 22, 2018

Related U.S. Application Data

(63) Continuation of application No. 15/231,353, filed on Aug. 8, 2016, now Pat. No. 10,069,729.

(51) Int. Cl.
*H04L 12/50* (2006.01)
*H04Q 11/00* (2006.01)
(Continued)

(52) U.S. Cl.
CPC ........ *H04L 47/2475* (2013.01); *H04L 45/306* (2013.01); *H04L 47/25* (2013.01)

(58) Field of Classification Search
CPC ........ H04L 45/748; H04L 45/60; H04L 47/25
See application file for complete search history.

(56) References Cited

U.S. PATENT DOCUMENTS

| | | | |
|---|---|---|---|
| 2011/0090908 | A1 | 4/2011 | Jacobson et al. |
| 2013/0182568 | A1 | 7/2013 | Lee et al. |

(Continued)

OTHER PUBLICATIONS

Amuda et al.[ A markov model of CCN pending interest tble occupancy with interest timeout and retries, IEEE, 2016). (Year: 2016).*

(Continued)

*Primary Examiner* — Maharishi V Khirodhar
(74) *Attorney, Agent, or Firm* — Edell, Shapiro & Finnan, LLC

(57) ABSTRACT

One embodiment provides a system that facilitates efficient communication based on a forwarding information base (FIB). The system receives, by an intermediate node, a first interest which includes a name and maximum interest information which indicates whether to forward a subsequent interest with a same name prefix as the first interest. In response to obtaining a first entry from a FIB based on the name for the first interest, the system adds to the first entry, for an outgoing interface corresponding to an arrival interface of the first interest, the maximum interest information included in the first interest as an interest limit for the first entry. In response to determining that the interest limit for the first entry is reached, the system refrains from forwarding the subsequent interest, thereby facilitating the intermediate node to manage traffic based on information in the forwarding information base provided by a content producer.

20 Claims, 9 Drawing Sheets

(51) Int. Cl.
   *H04L 12/859*    (2013.01)
   *H04L 12/725*    (2013.01)
   *H04L 12/825*    (2013.01)

(56) References Cited

U.S. PATENT DOCUMENTS

2016/0088514 A1   3/2016   Ohnishi et al.
2016/0134915 A1   5/2016   Oran
2018/0041438 A1   2/2018   Wood et al.

OTHER PUBLICATIONS

Around, Inferring and controlling congestion in CCN via the Pending Interest Table Occupancy, IEE 2016. (Year: 2016).*

Jun-Jae Kim, A traffic aware routing protocol for congestion avoidance in content centric network (International journal of multimedia and ubiquitous Engineering, vol. 9, 2014) (Year: 2014).*

Thomas, Let's collect Names: How PANINI Limits FIB tables in name Based Routing, Networking 2016. (Year: 2016).*

IEEE (An effective congestion control scheme in content centric networking, Tongmin Fu, Yang Li, tao lin, hongyan tan, hui tang and cong ci, Dec. 14-16, 2012) (Year: 2012).

IEEE(Efficient Multipath forwarding and congestion control without route-labeling in CCN, Din Nguyen, Masaki Fukushima,kohei sugiyama and Atsushi Tagami, Jun. 8-12, 2015) (Yesr: 2015).

An improved Hop-by-Hop interest shaper for congestion control in named data networking, yaogong Wang, Natalya Rozhnova, Ashok Narayanan and David Oran, Feb. 13, 2008) (Year: 2008).

IEEE( An explicit congestion control Algorithm for named data networking, yongmao Ren, Jun Li, Shanshan Shi, Lingling Li and Guodong Wang, Apr. 10-14, 2016) (Year: 2016).

IEEE( Network assisted congestion control for information centric networking, Anselme Ndikumana, Saeed Ullah, Rossi Kamal, Kyi Thar,Hyo Sung Kang,Seung Il, Moon and Choong seon Hong, Aug. 19-21, 2015) (Year: 2015).

* cited by examiner

SYSTEM AND METHOD FOR THROTTLING TRAFFIC BASED ON A FORWARDING INFORMATION BASE IN A CONTENT CENTRIC NETWORK

CROSS-REFERENCE TO RELATED APPLICATIONS

This application is a continuation of U.S. application Ser. No. 15/231,353, filed Aug. 8, 2016, the entirety of which is incorporated herein by reference.

BACKGROUND

This disclosure is generally related to distribution of digital content. More specifically, this disclosure is related to a system and method for throttling traffic to an upstream router or producer based on the number of outstanding interests on the upstream path.

RELATED ART

The proliferation of the Internet and e-commerce continues to create a vast amount of digital content. Content centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level.

Because intermediate CCN routers manage the rate at which interests are sent to the network, the routers drive flow control within the network. If many consumers issue unique interests to a single producer, this may result in a denial of service attack on the producer. In a current CCN protocol, the routers do not have real-time information on which to base their forwarding decisions. Thus, the routers will forward interests to an upstream next-hop neighbor node regardless of the possibility of increased congestion. One proposed solution relies on localized knowledge of congestion, while another proposed solution relies on notifications of congestion from upstream producers or routers. However, in the former case, localized knowledge may not work when routes are forced to detect attacks on their own, and in the latter case, notifications that arrive after an attack has already begun do not provide a proactive mechanism to deter attacks.

SUMMARY

One embodiment provides a system that facilitates efficient communication based on a forwarding information base (FIB). During operation, the system receives, by an intermediate node, a first interest which includes a name and maximum interest information, wherein a name is a hierarchically structured variable length identifier that includes contiguous name components ordered from a most general level to a most specific level, and wherein the maximum interest information indicates whether to forward a subsequent interest with a same name prefix as the first interest. In response to obtaining a first entry from a forwarding information base based on the name for the first interest, the system adds to the first entry, for an outgoing interface corresponding to an arrival interface of the first interest, the maximum interest information included in the first interest as an interest limit for the first entry. The system receives the subsequent interest. In response to determining that the interest limit for the first entry is reached, the system refrains from forwarding the subsequent interest, thereby facilitating the intermediate node to manage traffic based on information in the forwarding information base provided by a content producer.

In some embodiments, an entry in the forwarding information base includes: a name prefix which includes one or more contiguous name components of a name; and one or more tuples comprised of an outgoing interface, an interest limit, and a counter which is a number that tracks a number of outstanding interests forwarded on the respective outgoing interface, wherein an outstanding interest is an interest which is forwarded and has not been satisfied by a responsive content object.

In some embodiments, the system allocates the interest limit by transmitting one or more second interests to downstream routers, wherein a second interest includes the name and maximum interest information which is an allocated portion of the interest limit, wherein a sum of the allocated portions is equal to the interest limit. Allocating the interest limit is based on one or more of: an even distribution based on an equal or similar distribution; an uneven distribution based on network conditions; and a dynamic or a static distribution.

In some embodiments, the maximum interest information included in the first interest is a maximum number of outstanding interests to be forwarded based on the name prefix.

In some embodiments, the system determines whether the interest limit for the first entry is reached. The system selects an outgoing interface. In response to determining that the counter for the selected outgoing interface is less than the interest limit, the system forwards the subsequent interest via the selected outgoing interface, and increments by one the counter for the selected outgoing interface. In response to determining that the counter for the selected outgoing interface is not less than the interest limit, the system refrains from forwarding the subsequent interest via the selected outgoing interface.

In some embodiments, the maximum interest information included in the first interest is a maximum rate of interests to be forwarded based on the name prefix.

In some embodiments, the system determines whether the interest limit for the first entry is reached. The system selects an outgoing interface. The system computes a sliding forwarding rate for the first entry based on the selected outgoing interface. In response to determining that the computed rate is less than or equal to the interest limit, the system forwards the subsequent interest via the selected outgoing interface. In response to determining that the computed rate is greater than the interest limit, the system refrains from forwarding the subsequent interest via the selected outgoing interface.

BRIEF DESCRIPTION OF THE FIGURES

In the figures, like reference numerals refer to the same figure elements.

DETAILED DESCRIPTION

Figure 1A:
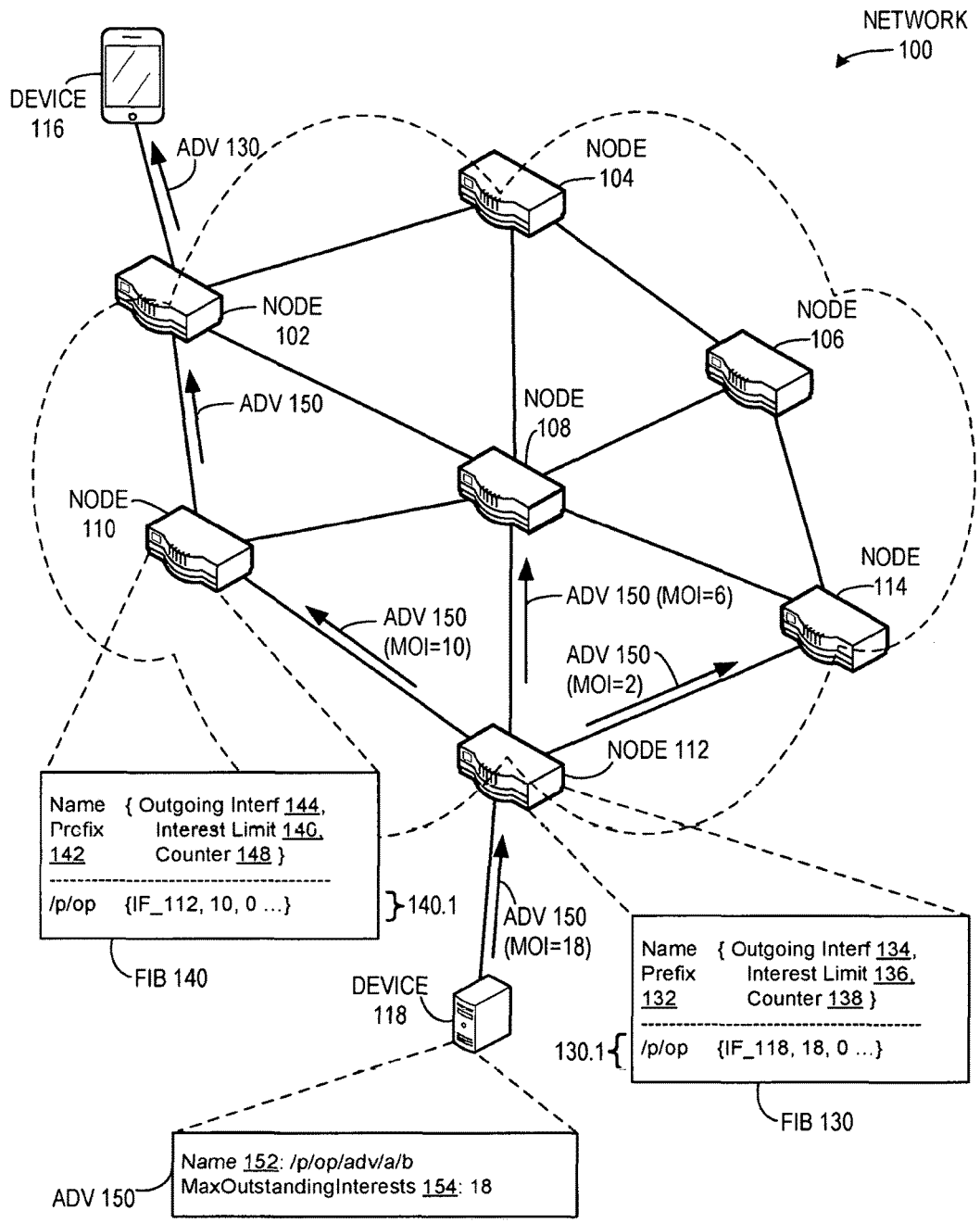
FIG. 1A illustrates an exemplary network which facilitates efficient communication based on a forwarding information base, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system in which a producer advertises maximum interest information to downstream routers, which allows the downstream routers to update their FIBs and manage the rate at which interests are forwarded to the producer. Recall that intermediate CCN routers manage the rate at which interests are sent to the network, and thus drive flow control within the network. If many consumers issue unique interests to a single producer, this may result in a denial of service attack on the producer. In a current CCN protocol, the routers do not have real-time information on which to base their forwarding decisions. Thus, the routers will forward interests to an upstream next-hop neighbor node regardless of the possibility of increased congestion. One proposed solution relies on localized knowledge of congestion, while another proposed solution relies on notifications of congestion from upstream producers or routers. However, in the former case, localized knowledge may not work when routes are forced to detect attacks on their own, and in the latter case, notifications that arrive after an attack has already begun do not provide a proactive mechanism to deter attacks.

Embodiments of the present invention solve the problem of proactively providing real-time information to downstream routers by allowing a producer to include maximum interest information in an advertisement. A receiving router can update a corresponding FIB entry based on the name prefix. The entry can also include a tuple, which includes: the outgoing interface (which corresponds to the arrival interface of the advertisement); an interest limit (which is the maximum interest information of the advertisement); and a counter (which is a number that corresponds to the number of outstanding interests forwarded via the respective interface). An outstanding interest is an interest which has been forwarded, and for which no responsive content object has been received. In other words, an outstanding interest is a previously transmitted and unsatisfied interest.

The maximum interest information included in the advertisement from the producer can include a maximum number of outstanding interests or a maximum rate. The maximum interest information can be used by a router as the interest limit for the corresponding FIB entry. When the interest limit is a maximum number of outstanding interests, the router can set the counter to an initial value of "O." The counter is maintained in the tuple for the outgoing interface which corresponds to the arrival interface of the advertisement. The router can increment the counter by one each time it forwards an interest via the corresponding interface. When the counter reaches the interest limit, the router can no longer forward an interest via the corresponding interface. The router may also decrement the counter by one each time an outstanding interest is satisfied by a responsive content object via the corresponding interface. The router must wait until the counter is less than the interest limit before the router can forward a subsequent interest via the corresponding interface.

When the interest limit is a maximum rate, the router can set the counter to an initial value of "null." The router can use the maximum rate as the interest limit. The router can compute a sliding forwarding rate for the corresponding FIB entry, and compare the computed rate against the maximum rate. The router can only forward interests when the computed rate is less than the maximum rate. The router can compute the sliding forwarding rate based on any sliding average algorithm.

Embodiments of the present system also allow a producer or a router to distribute its interest limit amongst one or more of its downstream routers. For example, a producer P can specify to its adjacent router R that its maximum number of outstanding interests is 8. R may have two downstream neighbors, NJ and N2. R can distribute the interest limit of 8 to NJ and N2 evenly (e.g., 4 each to NJ and N2), or unevenly (e.g., 6 to NJ, and 2 to N2). R can distribute the interest limit by replacing the maximum interest information in the received interest with the allocated number for the corresponding downstream node. R can also make a dynamic distribution or allocation decision based on perceived network conditions. For example, R may initially allocate the 8 interest limit as 6 to NJ and 2 to N2. Upon detecting an increase of traffic from N2 to the upstream interface, R may re-allocate the 8-interest limit as 1 to NJ and 7 to N2. An example of an unevenly distributed throttling is described below in relation to FIG. 1A.

By allowing a producer to transmit an interest which includes maximum interest information, the system allows receiving routers to modify and manage their corresponding FIB entries based on the interest. The FIB modification also allows the routers to subsequently make a forwarding decision for an interest based on the modified FIB entry, which facilitates efficient communication based on FIBs in the network.

Thus, the present system provides improvements to the distribution of digital content, where the improvements are fundamentally technological. Embodiments of the present invention provide a technological solution (e.g., providing maximum interest information in as interest limits in interests to allow intermediate routers to manage their FIBs and forward subsequent incoming interest based on the interest limits) to the technological problem of the efficient, secure, and effective distribution of digital content.

In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "Content Object"):

A single piece of named data, which is bound to a unique name. Current Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names:

A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components pare, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document. The HSVLI can also include contiguous name components ordered from a most general level to a most specific level.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847, 814, which is herein incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "Interest"):

A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

Face or Interface (or "Face" or "Interface"):

In CCN, the term "face" is a generalization of the concept of an interface. A face may be a connection to a network or directly to an application party. A face may be configured to send and receive broadcast or multicast packets on a particular network interface, or to send and receive packets using point-to-point addressing in the underlying transport, or using a tunnel (for example a TCP tunnel). A face may also be the connection to a single application process running on the same machine, via an encapsulation like UDP or an OS-specific inter-process communication path. All messages arrive through a face and are sent out through a face. In this disclosure, the term "neighbor" is interchangeable with the terms "face" and "interface," referring to an incoming or outgoing interface of an Interest.

"Prefix":

In this disclosure, the term "prefix" can be used to refer to either a name of a specific content object or a name prefix for the content object. A routable name prefix can determine the routing of a packet that indicates a request for a piece of data, and includes a name (or a name prefix) for the piece of data. A data consumer can disseminate a request or interest across an information-centric network, which CCN/NDN routers can propagate toward a storage device (e.g., a cache server) or a data producer that can provide the requested data to satisfy the request or interest.

The methods disclosed herein are not limited to CCN networks and are applicable to other architectures as well. A description of a CCN architecture is described in U.S. patent application Ser. No. 12/338,175, which is herein incorporated by reference.

Exemplary Network and Communication

FIG. 1A illustrates an exemplary network which facilitates efficient communication based on a forwarding information base, in accordance with an embodiment of the present invention. Network 100 can include a consumer or content requesting device 116, a producer or content producing device 118, and a router or other forwarding device at nodes 102, 104, 106, 108, 110, 112, and 114. A node can be a computer system, an end-point representing users, and/or a device that can generate interests or originate content. A node can also be an edge router (e.g., CCN nodes 102, 104, 112, and 114) or a core router (e.g., intermediate CCN routers 106, 108, and 110). Network 100 can be a content centric network.

During operation, producer or device 118 can determine to set a limit for a particular name prefix to downstream routers, and advertise "maximum interest information" for setting an interest limit, which allows a downstream router to throttle incoming interests for the name prefix. The maximum interest information can be a maximum number of outstanding interests or a maximum rate of interests. Producer 118 can send an interest or advertisement 150 with a name 152 of "/p/op/adv/a/b" and a maximum outstanding interests ("MOI") field 154 with a value of "18," which indicates that a downstream router cannot forward an interest to an upstream interface if there exists 18 unsatisfied or outstanding interest already forwarded to the same interface. Advertisement 150 can travel through network 100 via intermediate nodes 112, 110, and 102 before reaching consumer or device 116. Each of these intermediate nodes can update their FIBs based on the maximum interest information included in advertisement 150. For example node 112 can have a FIB 130 with entries that include a name prefix 132 and a list of outgoing interfaces 134 which each have a corresponding interest limit 136 and a counter 138. Interest limit 136 corresponds to the maximum interest information received in an advertisement from an upstream node. Counter 138 tracks the number of outstanding interfaces sent to the corresponding interface.

Node 112 can receive advertisement 150 and obtain a matching entry 130.1 from FIB 130 based on the name prefix "/p/op." For the outgoing interface corresponding to the arrival interface of interest 150 (i.e., "IF_118"), node 112 can set the interest limit 136 for that interface to "18," which is the maximum interest information included in interest 150 (i.e., "MOI=18").

Node 112 can also determine to distribute the received interest limit (of 18) for the advertised name prefix "/p/op." and allocate the interest limit to its downstream routers by transmitting one or more interests to the downstream routers. The allocation can be based on an even distribution. The allocation can also be an uneven distribution which is based on perceived network conditions. The allocation can also be dynamic. For example, based on an even distribution, node 112 can update advertisement 150 by replacing MOI 154 with a value of "6" and send the updated advertisement 150 to each of nodes 110, 108, and 114 (not shown). Alternatively, node 112 may determine that it has observed a higher amount of traffic in the past two minutes from node 110, and instead allocate the interest limit of 18 in the following manner: 10 to node 110; 6 to node 108; and 2 to node 114 (as indicated by the various advertisements 150 and the corresponding MOIs.)

Similar to node 112, receiving nodes can update their FIBs based on the maximum interest information included in the interest. For example, node 110, can receive updated advertisement 150 with MOI=10 and obtain a matching entry 140.1 from FIB 140 based on the name prefix "/p/op." For the outgoing interface corresponding to the arrival interface of interest 140 (i.e., "IF_112"), node 110 can set the interest limit 146 for that interface to "10," which is the maximum interest information included in interest 130 (i.e., "MOI=10"). In addition, similar to node 112, node 110 can determine to distribute its received interest limit in a similar manner to its downstream routers. Processing an interest or advertisement with a maximum number of outstanding interests is described below in relation to FIG. 3C.

In some embodiments, instead of including a maximum number of outstanding interests, interest 150 can include a maximum rate of interests, which is used to limit the number of interests that are forwarded by computing and comparing the forwarding rate for a respective entry against the maximum rate. For example, producer 118 can transmit interest 150 to node 112 with a maximum rate of "t," and node 112 can determine to allocate the interest limit evenly to its three downstream routers (i.e., 110, 108 and 114), by replacing the maximum rate in interest 150 with a value of "t/3." Processing an interest or advertisement with a maximum rate is described below in relation to FIG. 3D.

Figure 1B:
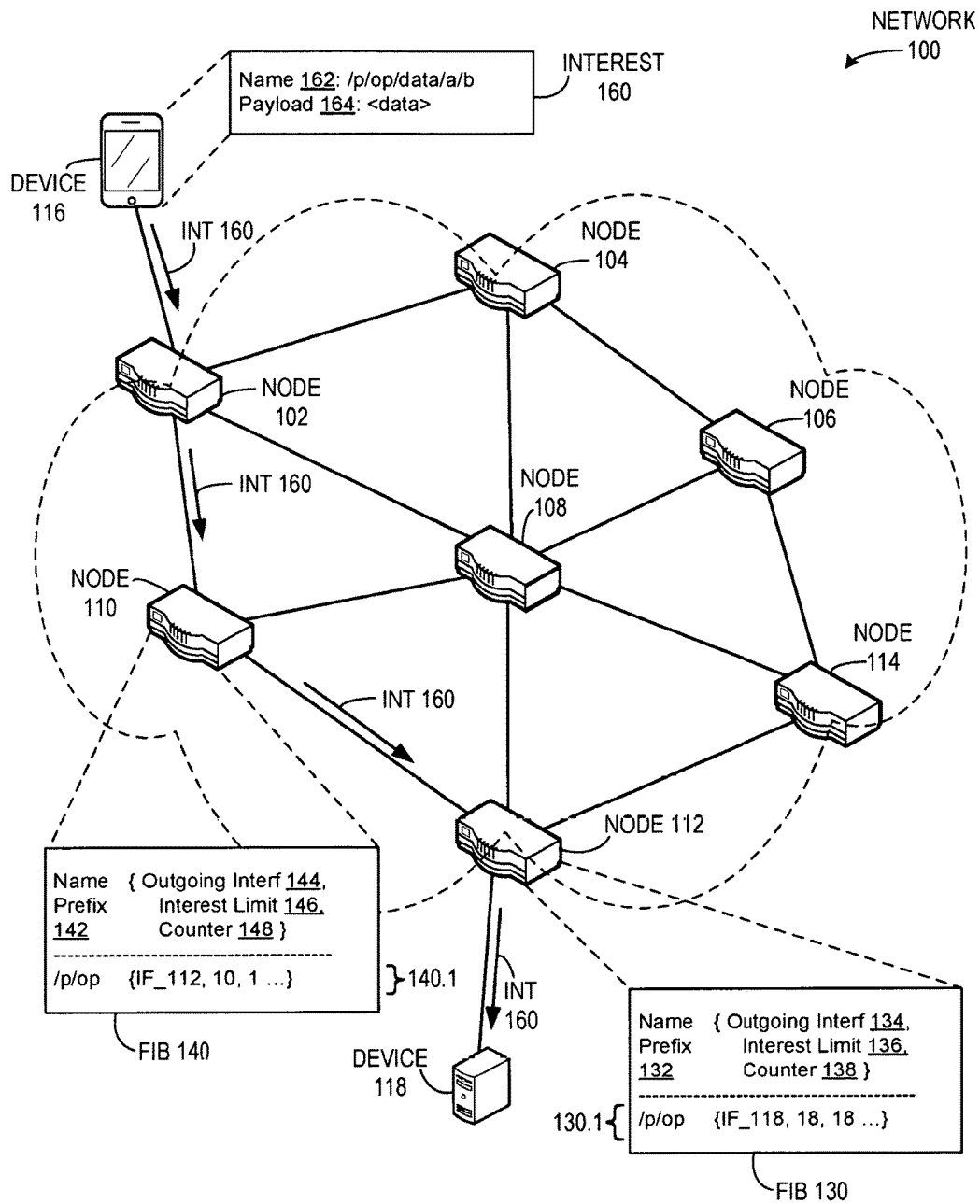
FIG. 1B illustrates an exemplary network which facilitates efficient communication based on a forwarding information base, in accordance with an embodiment of the present invention.

A subsequent interest with the same name prefix as the advertised interest can be processed by a receiving router based on the interest limit previously inserted into the router's FIB. FIG. 1B illustrates an exemplary network which facilitates efficient communication based on a forwarding information base, in accordance with an embodiment of the present invention. Consumer or content consuming device 116 can generate an interest 160 with a name 162 of "/p/op/data/a/b" and an optional payload 164 of "<data>." Interest 160 can travel through network 100 via intermediate nodes 102, 110, and 112 before reaching producer 118. Each of these intermediate nodes, having previously received advertisement 150 and updated their FIBs accordingly, can receive interest 160, obtain the matching FIB entry, select an outgoing interface, obtain the interest limit, determine whether the interest limit is reached, and process interest 160 accordingly. For example, node 110 can receive interest 160 and obtain the matching FIB entry 140.1 from its FIB 140. Node 110 can select the outgoing interface "IF_112" which has a corresponding interest limit of "10" and a counter of "0." Node 110 can determine that the counter is less than the limit, and forward interest 160 via the outgoing interface "IF_112." Node 110 can also increment the counter by one, e.g., from "0" to "1," as reflected in FIB 140 of FIG. 1B.

Subsequently, node 112 can receive interest 160 and obtain the matching FIB entry 130.1 from its FIB 130. Node 110 can select the outgoing interface "IF_118" which has a corresponding interest limit of "18" and a counter of "18" (assuming that node 112 has transmitted 18 unsatisfied or outstanding interests for the same name prefix via this interface). Node 112 can determine that the counter is not less than the limit, and refrain from forwarding interest 160 via the outgoing interface "IF_112." Node 112 can wait (e.g., for a predetermined period of time), and then the condition (of whether the counter is less than the limit), or continue to check the condition at predetermined intervals, for a predetermined period of time. For example, if one of the 18 outstanding interests is satisfied (e.g., node 112 receives and processes a responsive content object, and accordingly decrements the counter by one from "18" to "17"), node 112 can forward interest 160 via the outgoing interface "IF_118."

Thus, by allowing the producer to determine and include maximum interest information in an advertisement for content under a certain domain or name prefix, a downstream router can add the interest limit to its FIB, and additionally distribute or allocate the interest limit to its downstream routers, as shown in relation to FIG. 1A. The routers can subsequently manage traffic based on the information in their FIBs. That is, the routers can throttle incoming interests based on the interest limits previously provided by an upstream producer or router. Thus, embodiments of the present invention provide a system which facilitates efficient communication based on information in the forwarding information base.

Exemplary Interests/Advertisement and Forwarding Information Bases

Figure 2A:
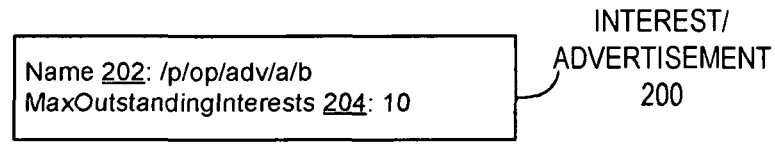
FIG. 2A illustrates an exemplary interest or advertisement where the maximum interest information is a maximum number of outstanding interests, in accordance with an embodiment of the present invention.

FIG. 2A illustrates an exemplary interest or advertisement 200 where the maximum interest information is a maximum number of outstanding interests, in accordance with an embodiment of the present invention. Interest 200 can include a name 202 of "/p/op/adv/a/b" and a maximum outstanding interests 204 field with a value of "10," which indicates that a downstream router cannot forward an interest to an upstream interface if there exists 10 unsatisfied or outstanding interest already forwarded to the same interface.

Figure 2B:
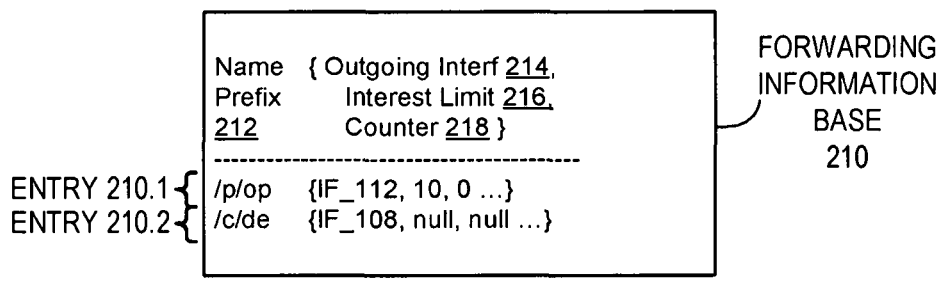
FIG. 2B illustrates an exemplary forwarding information base updated based on the exemplary interest or advertisement of FIG. 2A, in accordance with an embodiment of the present invention.

FIG. 2B illustrates an exemplary forwarding information base 210 updated based on the exemplary interest or advertisement of FIG. 2A, in accordance with an embodiment of the present invention. FIB 210 can include entries with a name prefix 212 and tuples comprised of an outgoing interface 214, an interest limit 216, and a counter 218. For example, FIB 210 can include an entry 210.1 with a name prefix of "/p/op," and a tuple consisting of an outgoing interface equal to "IF_112," an interest limit of 10, and a counter with a value of "0." Entry 210.1 corresponds to an update performed to FIB 210 by a router based on receiving interest 200. FIB 210 can also include an entry 210.2 with a name prefix of "/c/de," and a tuple consisting of an outgoing interface equal to "IF_108," an interest limit with a value of "null," and a counter with a value of "null."

Figure 2C:
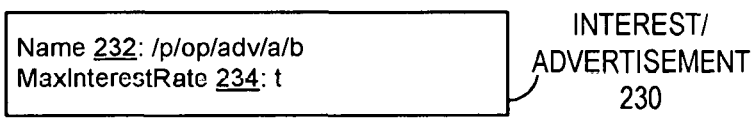
FIG. 2C illustrates an exemplary interest or advertisement where the maximum interest information is a maximum rate of interests, in accordance with an embodiment of the present invention.

FIG. 2C illustrates an exemplary interest or advertisement 230 where the maximum interest information is a maximum rate of interests, in accordance with an embodiment of the present invention. Interest 230 can include a name 232 of "/p/op/adv/a/b" and a maximum outstanding interest rate 234 field with a value of "t," which indicates that a downstream router cannot forward an interest to an upstream interface if a computed sliding forwarding rate is more than the maximum interest rate, t.

Figure 2D:
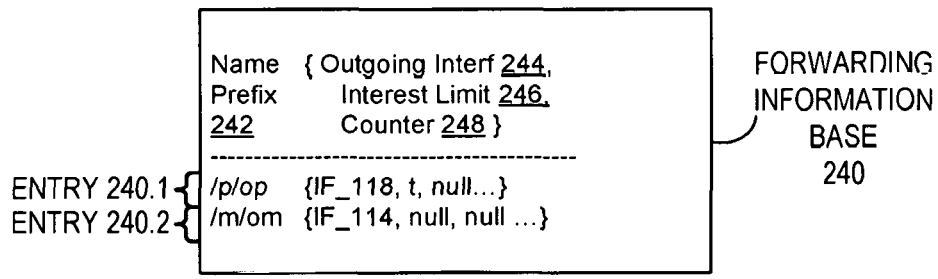
FIG. 2D illustrates an exemplary forwarding information base updated based on the exemplary interest or advertisement of FIG. 2C, in accordance with an embodiment of the present invention.

FIG. 2D illustrates an exemplary forwarding information base 240 updated based on the exemplary interest or advertisement of FIG. 2C, in accordance with an embodiment of the present invention. FIB 240 can include entries with a name prefix 242 and tuples comprised of an outgoing interface 244, an interest limit 246, and a counter 248. For example, FIB 240 can include an entry 240.1 with a name prefix of "/p/op," and a tuple consisting of an outgoing interface equal to "IF_118," an interest limit of "t," and a counter with a value of "null." In some embodiments, the counter includes information associated with both the number of interests forwarded and a corresponding time period, and can also include the most recently computed sliding forwarding rate for the entry. Entry 240.1 corresponds to an update performed to FIB 240 by a router based on receiving interest 230. FIB 240 can also include an entry 240.2 with a name prefix of "/m/om," and a tuple consisting of an outgoing interface equal to "IF_114," an interest limit with a value of "null," and a counter with a value of "null."

Intermediate Router Facilitates FIB-Based Traffic Throttling

Figure 3A:
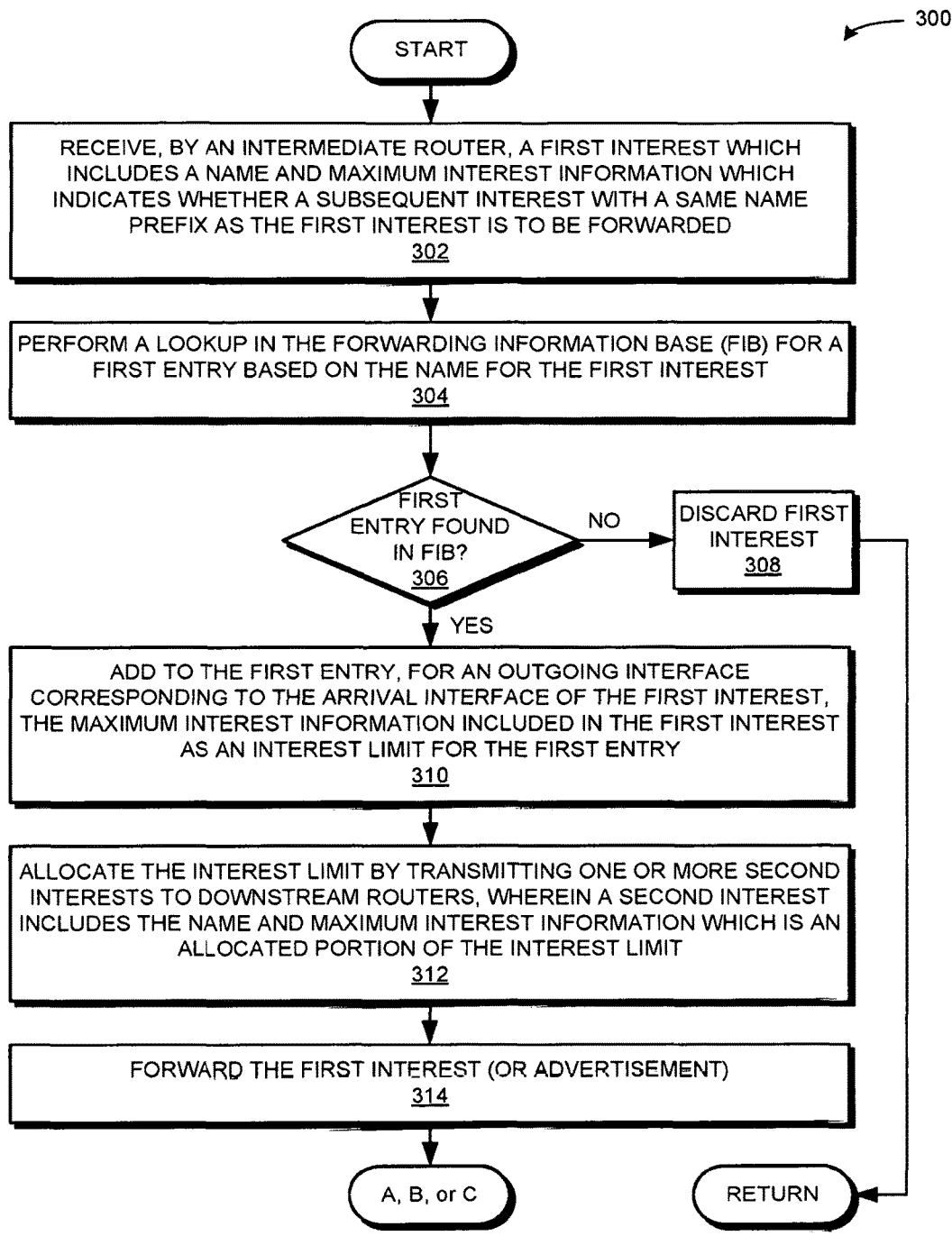
FIG. 3A presents a flow chart illustrating a method by an intermediate router for facilitating efficient communication based on a forwarding information base, in accordance with an embodiment of the present invention.

FIG. 3A presents a flow chart 300 illustrating a method by an intermediate router for facilitating efficient communication based on a forwarding information base, in accordance with an embodiment of the present invention. During operation, the system receives, by an intermediate router, a first interest which include a name and maximum interest information which indicates whether a subsequent interest with a same name prefix as the first interest is to be forwarded (operation 302). The first interest can be an advertisement which does not leave state in a pending interest table or require a responsive content object. A name can be a hierarchically structured variable length identifier that includes contiguous name components ordered from a most general level to a most specific level, and a name prefix can include one or more of the contiguous name components of the name. The system performs a lookup in the forwarding information base (FIB) for a first entry based on the name for the first interest (operation 304). An entry in a FIB can include a name prefix and one or more tuples comprised of an outgoing interface, an interest limit, and a counter which is a number that tracks a number of interests forwarded on the respective outgoing interface. If the first entry is not found in the FIB (decision 306), the system can discard the first interest (operation 308), and the operation returns. If the first entry is obtained from or found in the FIB (decision 306), the system adds to the first entry, for an outgoing interface corresponding to the arrival interface of the first interest, the maximum interest information included in the first interest as an interest limit for the first entry (operation 310).

The system can allocate the interest limit by transmitting one or more second interests to downstream routers, wherein a second interest includes the name and maximum interest information which is an allocated portion of the interest limit (operation 312). The sum of the allocated portions of the second interests is equal to the interest limit. The system can allocate the interest limit based on an equal division or distribution. The system can also allocate the interest limit unequally based on system parameters, perceived network conditions, or other strategy or scheduling constraints of the system. The system can forward the first interest (or advertisement) as appropriate (operation 314). The operation can continue as described at any of Labels A, B, or C of FIGS. 3B, 3C, and 3D, respectively.

Figure 3B:
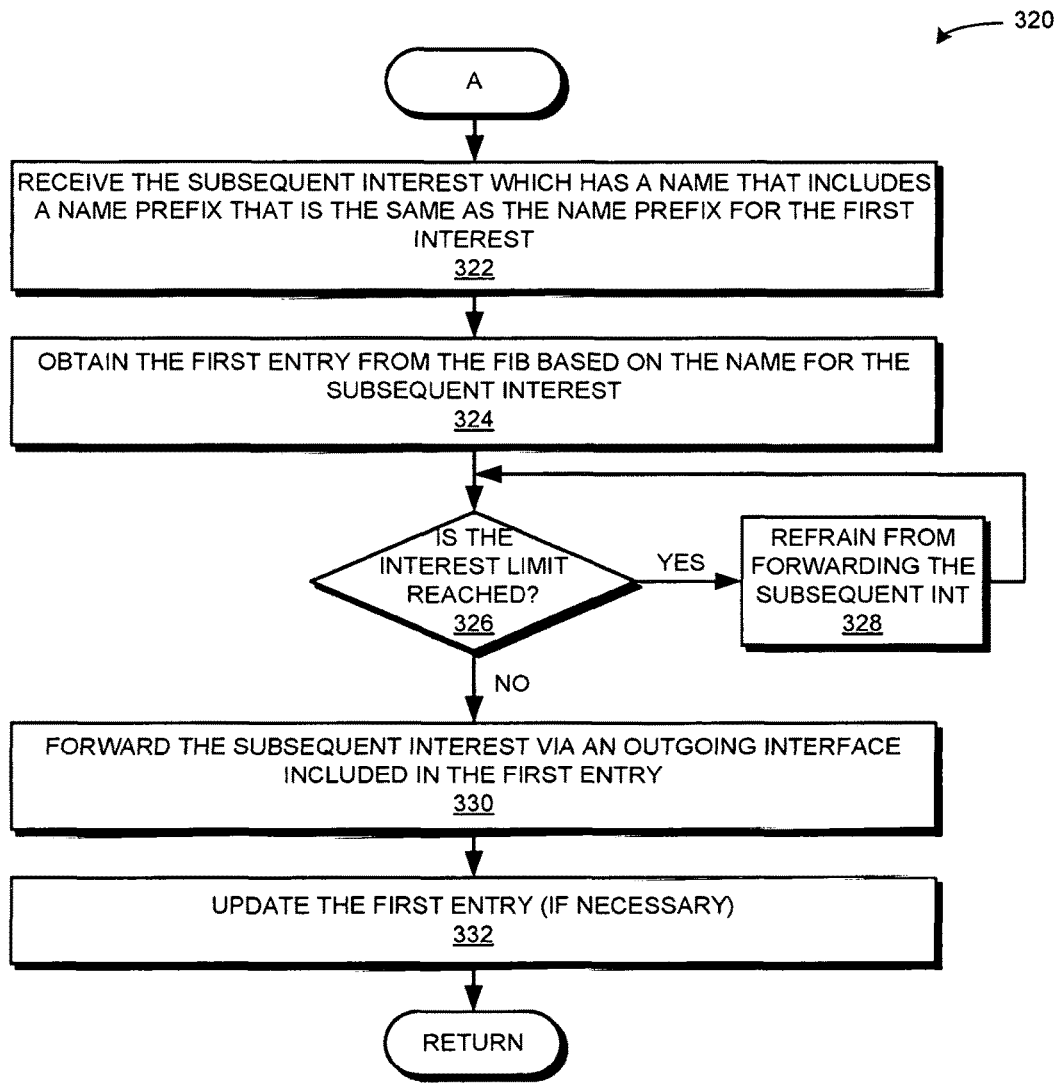
FIG. 3B presents a flow chart illustrating a method by an intermediate router for facilitating efficient communication based on a forwarding information base, including receiving and processing a subsequent interest, in accordance with an embodiment of the present invention.

FIG. 3B presents a flow chart 320 illustrating a method by an intermediate router for facilitating efficient communication based on a forwarding information base, including receiving and processing a subsequent interest, in accordance with an embodiment of the present invention. During operation, the system receives, by the intermediate router, the subsequent interest which has a name that includes a name prefix that is the same as the name prefix for the first interest (operation 322). The system obtains the first entry from the FIB based on the name for the subsequent interest (operation 324). If the interest limit (as indicated in the first entry for a corresponding outgoing interface) is reached (decision 326), the system refrains from forwarding the subsequent interest to that outgoing interface (operation 328). The system can wait until the interest limit changes (e.g., the intermediate router receives and processes another advertisement, and updates the interest limit in the FIB to a greater number or a higher rate). The system can also wait until the interest limit is no longer reached (e.g., the counter is less than the interest limit, due to the router satisfying an outstanding interest via the specific outgoing interface, and decrementing the counter for that interface).

If the interest limit is not reached (operation 326), the system forwards the subsequent interest via the specific outgoing interface included in the first entry (operation 330). The system can update the first entry, if necessary (operation 332) (e.g., by incrementing the counter, if the interest limit is a maximum number of outstanding interests).

Figure 3C:
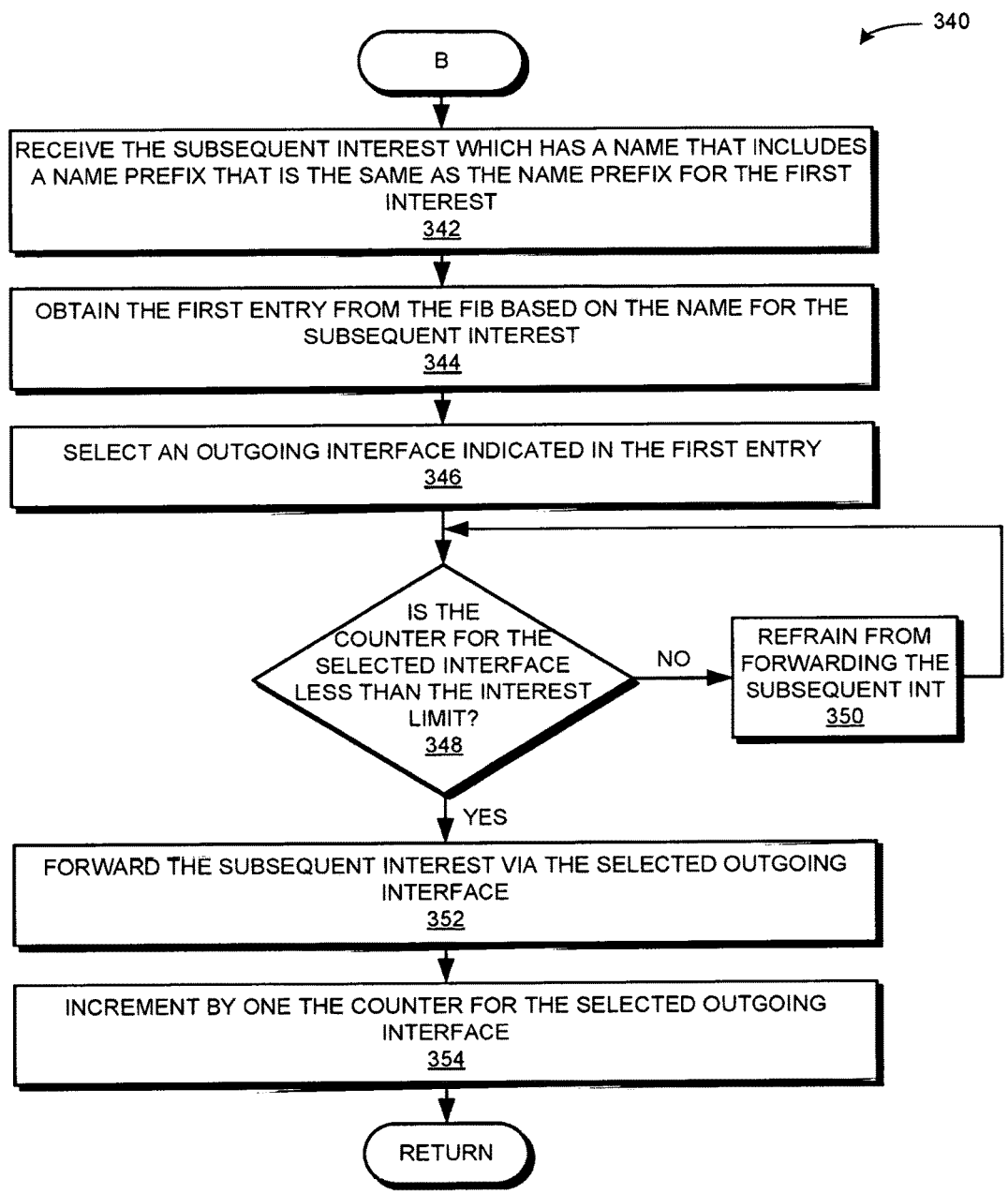
FIG. 3C presents a flow chart illustrating a method by an intermediate router for facilitating efficient communication based on a forwarding information base, bawd on a maximum number of outstanding interests, in accordance with an embodiment of the present invention.

Intermediate Router Facilitates FIB-Based Traffic Throttling: Maximum Number of Outstanding Interests FIG. 3C presents a flow chart 340 illustrating a method by an intermediate router for facilitating efficient communication based on a forwarding information base, based on a maximum number of outstanding interests, in accordance with an embodiment of the present invention. During operation, the system receives, by the intermediate router, the subsequent interest which has a name that includes a name prefix that is the same as the name prefix for the first interest (operation 342). The system obtains the first entry from the FIB based on the name for the subsequent interest (operation 344). The system selects an outgoing interface indicated in the first entry (operation 346). If the counter for the selected outgoing interface is not less than the corresponding interest limit (decision 348), the system refrains from forwarding the subsequent interest to the selected outgoing interface (operation 350). As described above in relation to operation 328 of FIG. 3B, the system can wait, and continue to check whether the counter is less than the interest limit.

If the counter for the selected outgoing interface is less than the corresponding interest limit (decision 348), the system can forward the subsequent interest via the selected outgoing interface (operation 352), and increment by one the counter for the selected outgoing interface (operation 354).

Figure 3D:
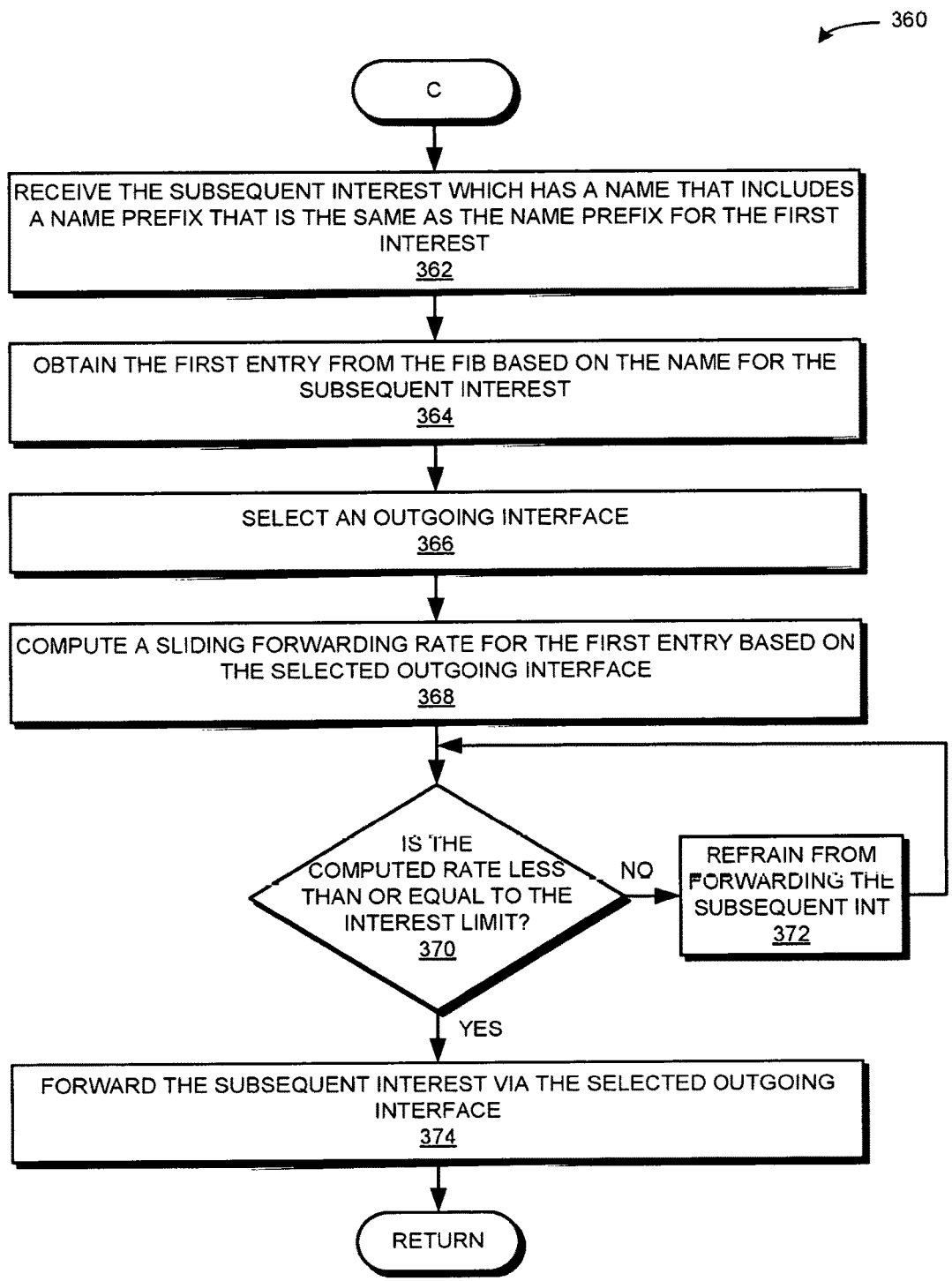
FIG. 3D presents a flow chart illustrating a method by an intermediate router for facilitating efficient communication based on a forwarding information base, based on a maximum rate of outstanding interests, in accordance with an embodiment of the present invention.

Intermediate Router Facilitates FIB-Based Traffic Throttling: Maximum Rate of Interests FIG. 3D presents a flow chart 360 illustrating a method by an intermediate router for facilitating efficient communication based on a forwarding information base, based on a maximum rate of outstanding interests, in accordance with an embodiment of the present invention. During operation, the system receives, by the intermediate router, the subsequent interest which has a name that includes a name prefix that is the same as the name prefix for the first interest (operation 362). The system obtains the first entry from the FIB based on the name for the subsequent interest (operation 364). The system selects an outgoing interface indicated in the first entry (operation 366). The system computes a sliding forwarding rate for the first entry based on the selected outgoing interface. The rate can be based on a number of outstanding interests sent via the selected outgoing interface, which can be indicated and tracked by the counter. The system can compute the sliding forwarding rate using any sliding average algorithm, e.g., by computing the average number of outstanding interests every second. If the computed rate is not less than or equal to the interest limit (decision 370), the system refrains from forwarding the subsequent interest to the selected outgoing interface (operation 372). As described above in relation to operation 328 of FIG. 3B, the system can wait, and continue to check whether the counter is less than the interest limit.

If the computed rate is less than or equal to the interest limit (decision 370), the system can forward the subsequent interest via the selected outgoing interface (operation 374). The system can also indicate in the counter the transmittal of the interest, for a certain time period, such that the counter can track and include information that the system can subsequently use to calculate the sliding forwarding rate for the entry.

Content Producing Device Facilitates FIB-Based Traffic Throttling

Figure 4:
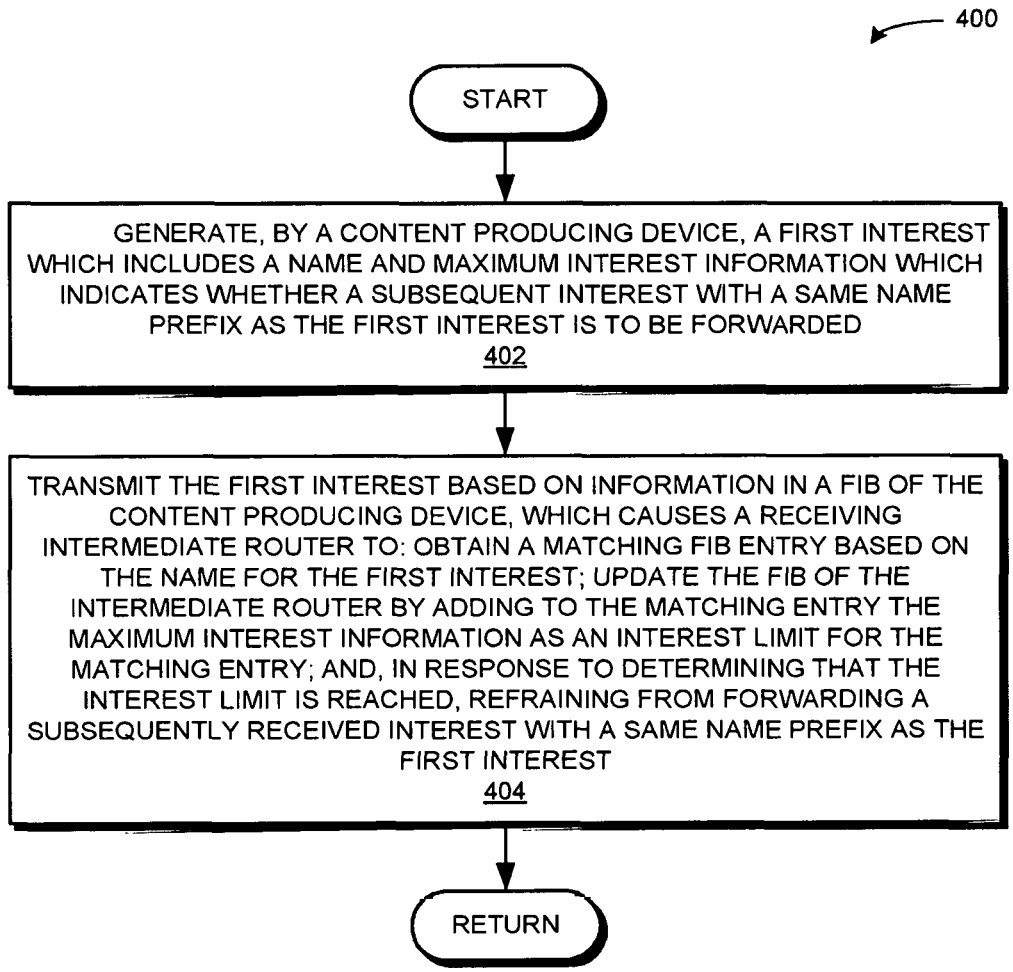
FIG. 4 presents a flow chart illustrating a method by a content producing device for facilitating efficient communication based on a forwarding information base, in accordance with an embodiment of the present invention.

FIG. 4 presents a flow chart 400 illustrating a method by a content producing device for facilitating efficient communication based on a forwarding information base, in accordance with an embodiment of the present invention. During operation, the system generates, by a content producing device, a first interest that includes a name and maximum interest information which indicates whether a subsequent interest with a same name prefix as the first interest is to be forwarded (operation 402). The first interest can be an advertisement of the content producing device for content under a domain of the content producing device. The advertisement does not require a responsive content object and does not leave state information in a pending interest table. The system transmits the first interest based on information in a FIB of the content producing device, which causes a receiving intermediate router to: obtain a matching FIB entry based on the name for the first interest; update the FIB of the intermediate router by adding to the matching entry the maximum interest information as an interest limit for the matching entry; and, in response to determining that the interest limit is reached, refrain from forwarding a subsequently received interest with a same name prefix as the first interest (operation 404).

Exemplary Computer System

Figure 5:
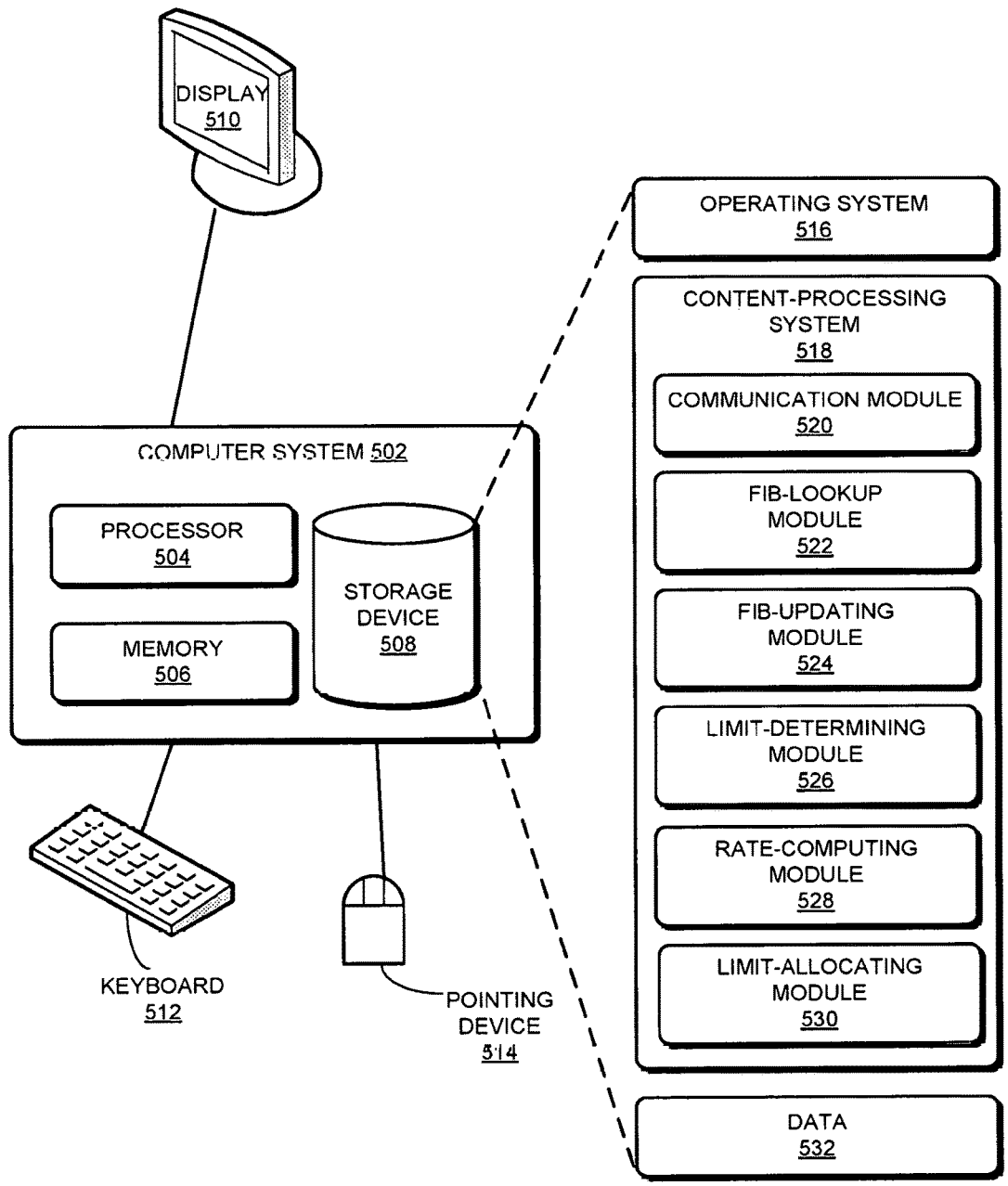
FIG. 5 illustrates an exemplary computer system that facilitates efficient communication based on a forwarding information base, in accordance with an embodiment of the present invention.

FIG. 5 illustrates an exemplary computer system 502 that facilitates efficient communication based on a forwarding information base, in accordance with an embodiment of the present invention. Computer system 502 includes a processor 504, a memory 506, and a storage device 508. Memory 506 can include a volatile memory (e.g., RAM) that serves as a managed memory, and can be used to store one or more memory pools. Furthermore, computer system 502 can be coupled to a display device 510, a keyboard 512, and a pointing device 514. Storage device 508 can store an operating system 516, a content-processing system 518, and data 532.

Content-processing system 518 can include instructions, which when executed by computer system 502, can cause computer system 502 to perform methods and/or processes described in this disclosure. Specifically, content-processing system 518 may include instructions for sending and/or receiving data packets to/from other network nodes across a computer network, such as a content centric network (communication module 520). A data packet can include an advertisement, an interest packet, or a content object packet with a name which is an HSVLI that includes contiguous name components ordered from a most general level to a most specific level.

Further, content-processing system 518 can include instructions for receiving, by an intermediate node, a first interest that includes a name and maximum interest information which indicates whether to forward a subsequent interest with a same name prefix as the first interest (communication module 520). Content-processing system 518 can also include instructions for, in response to obtaining a first entry from a forwarding information base based on the name for the first interest (FIB-lookup module 522), adding to the first entry, for an outgoing interface corresponding to an arrival interface of the first interest, the maximum interest information included in the first interest as an interest limit for the first entry (FIB-updating module 524). Content-processing system 518 can include instructions for receiving the subsequent interest (communication module 520). Content-processing system 518 can further include instructions for, in response to determining that the interest limit for the first entry is reached (limit-determining module 526), refraining from forwarding the subsequent interest (communication module 520). Content-processing system 518 can include instructions for allocating the interest limit by transmitting one or more second interests to downstream routers (limit-allocating module 530).

Content-processing system 518 can additionally include instructions for selecting an outgoing interface (limit-determining module 526). Content-processing system 518 can include instructions for, in response to determining that the counter for the selected outgoing interface is less than the interest limit (limit-determining module 526): forwarding the subsequent interest via the selected outgoing interface (communication module 520); and incrementing by one the counter for the selected outgoing interface (FIB-updating module 524). Content-processing system 518 can also include instructions for, in response to determining that the counter for the selected outgoing interface is not less than the interest limit (limit-determining module 526), refraining from forwarding the subsequent interest via the selected outgoing interface (communication module 520).

Content-processing system 518 can further include instructions for selecting an outgoing interface (limit-determining module 526). Content-processing system 518 can include instructions for computing a sliding forwarding rate for the first entry based on the selected outgoing interface (rate-computing module 528). Content-processing system 518 can also include instructions for, in response to determining that the computed rate is less than or equal to the interest limit (limit-determining module 526), forwarding the subsequent interest via the selected outgoing interface (communication module 520). Content-processing system 518 can include instructions for, in response to determining that the computed rate is greater than the interest limit (limit-determining module 526), refraining from forwarding the subsequent interest via the selected outgoing interface (communication module 520).

Data 532 can include any data that is required as input or that is generated as output by the methods and/or processes described in this disclosure. Specifically, data 532 can store at least: an interest; an advertisement; a content object; a name; a name that is an HSVLI that includes contiguous name components ordered from a most general level to a most specific level; a routable prefix or a name prefix that indicates one or more contiguous name components beginning from the most general level; maximum interest information; an interest limit; a forwarding information base (FIB); an entry in a FIB; a pending interest table (PIT); a tuple comprised of an outgoing interface, an interest limit, and a counter; an allocation of an interest limit; an algorithm for computing a sliding forwarding rate for a FIB entry; a method for an even distribution; a method for an uneven distribution; perceived network conditions; a method for a dynamic or a static distribution; an outstanding interest which is an interest which is forwarded and has not been satisfied by a responsive content object; a maximum number of outstanding interests to be forwarded based on a name prefix; an outgoing interface; and a maximum rate of interests to be forwarded based on a name prefix.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method comprising:
   receiving, by an intermediate node, an advertisement from an upstream node, the advertisement including a name and maximum interest information for a content object, wherein the maximum interest information includes a maximum number of outstanding interests for the content object;
   obtaining, by the intermediate node, an entry based on the name included in the advertisement;
   adding, by the intermediate node, the maximum interest information to the entry;
   receiving, by the intermediate node, an interest indicating the name of the content object;
   determining, by the intermediate node, whether the maximum number of outstanding interests for the content object has been reached; and
   when the maximum number of outstanding interests for the content object has been reached, refraining, by the intermediate node, from forwarding the interest to the upstream node.

2. The method of claim 1, wherein the name is a hierarchically structured variable length identifier that includes contiguous name components ordered from a most general level to a most specific level.

3. The method of claim 1, wherein the entry is obtained from a forwarding information base that includes:
   a name prefix which includes one or more contiguous name components of a name; and
   one or more tuples comprised of an outgoing interface, an interest limit, and a counter which is a number that tracks a number of outstanding interests forwarded on the respective outgoing interface, wherein an outstanding interest is an interest which is forwarded and has not been satisfied by a responsive content object.

4. The method of claim 3, further comprising:
   allocating the interest limit by transmitting one or more second advertisements to downstream nodes, wherein a second advertisement includes the name and maximum interest information which is an allocated portion of the interest limit, wherein a sum of the allocated portions is equal to the interest limit, and wherein allocating the interest limit is based on one or more of:
   an even distribution based on an equal or similar distribution;
   an uneven distribution based on network conditions; and
   a dynamic or a static distribution.

5. The method of claim 3, further comprising determining whether the interest limit for the entry is reached, which comprises:
   selecting an outgoing interface;

in response to determining that the counter for the selected outgoing interface is less than the interest limit:
  forwarding the interest via the selected outgoing interface;
  incrementing by one the counter for the selected outgoing interface; and
in response to determining that the counter for the selected outgoing interface is not less than the interest limit, refraining from forwarding the interest via the selected outgoing interface.

6. The method of claim 3, wherein the maximum interest information included in the interest is a maximum rate of interests to be forwarded based on the name prefix.

7. The method of claim 6, further comprising determining whether the interest limit for the entry is reached, which comprises:
  selecting an outgoing interface;
  computing a sliding forwarding rate for the entry based on the selected outgoing interface;
  in response to determining that the sliding forwarding rate is less than or equal to the interest limit, forwarding the interest via the selected outgoing interface; and
  in response to determining that the sliding forwarding rate is greater than the interest limit, refraining from forwarding the interest via the selected outgoing interface.

8. An apparatus comprising:
  a communication interface configured to enable network communications;
  a hardware processor coupled with the communication interface, and configured to:
    receive an advertisement from an upstream node, the advertisement including a name and maximum interest information for a content object, wherein the maximum interest information includes a maximum number of outstanding interests for the content object;
    obtain an entry based on the name included in the advertisement;
    add the maximum interest information to the entry;
    receive an interest indicating the name of the content object;
    determine whether the maximum number of outstanding interests for the content object has been reached; and
    when the maximum number of outstanding interests for the content object has been reached, refrain from forwarding the interest to the upstream node.

9. The apparatus of claim 8, wherein the name is a hierarchically structured variable length identifier that includes contiguous name components ordered from a most general level to a most specific level.

10. The apparatus of claim 8, wherein the entry is obtained from a forwarding information base that includes:
  a name prefix which includes one or more contiguous name components of a name; and
  one or more tuples comprised of an outgoing interface, an interest limit, and a counter which is a number that tracks a number of outstanding interests forwarded on the respective outgoing interface, wherein an outstanding interest is an interest which is forwarded and has not been satisfied by a responsive content object.

11. The apparatus of claim 10, wherein the hardware processor is further configured to:
  allocate the interest limit by transmitting one or more second advertisements to downstream nodes, wherein a second advertisement includes the name and maximum interest information which is an allocated portion of the interest limit, wherein a sum of the allocated portions is equal to the interest limit, and wherein allocating the interest limit is based on one or more of:
  an even distribution based on an equal or similar distribution;
  an uneven distribution based on network conditions; and
  a dynamic or a static distribution.

12. The apparatus of claim 10, wherein the hardware processor is further configured to:
  determine whether the interest limit for the entry is reached;
  select an outgoing interface;
  in response to determining that the counter for the selected outgoing interface is less than the interest limit:
    forward the interest via the selected outgoing interface;
    increment by one the counter for the selected outgoing interface; and
  in response to determining that the counter for the selected outgoing interface is not less than the interest limit, refrain from forwarding the interest via the selected outgoing interface.

13. The apparatus of claim 10, wherein the maximum interest information included in the interest is a maximum rate of interests to be forwarded based on the name prefix.

14. The apparatus of claim 13, wherein the hardware processor is further configured to:
  determine whether the interest limit for the entry is reached;
  select an outgoing interface;
  compute a sliding forwarding rate for the entry based on the selected outgoing interface;
  in response to determining that the sliding forwarding rate is less than or equal to the interest limit, forward the interest via the selected outgoing interface; and
  in response to determining that the sliding forwarding rate is greater than the interest limit, refrain from forwarding the interest via the selected outgoing interface.

15. One or more non-transitory computer-readable storage media encoded with instructions that, when executed by a processor, cause the processor to:
  receive an advertisement from an upstream node, the advertisement including a name and maximum interest information for a content object, wherein the maximum interest information includes a maximum number of outstanding interests for the content object;
  obtain an entry based on the name included in the advertisement;
  add the maximum interest information to the entry;
  receive an interest indicating the name of the content object;
  determine whether the maximum number of outstanding interests for the content object has been reached; and
  when the maximum number of outstanding interests for the content object has been reached, refrain from forwarding the interest to the upstream node.

16. The computer-readable storage media of claim 15, wherein the name is a hierarchically structured variable length identifier that includes contiguous name components ordered from a most general level to a most specific level.

17. The computer-readable storage media of claim 15, wherein the entry is obtained from a forwarding information base that includes:
  a name prefix which includes one or more contiguous name components of a name; and
  one or more tuples comprised of an outgoing interface, an interest limit, and a counter which is a number that tracks a number of outstanding interests forwarded on the respective outgoing interface, wherein an outstanding interest is an interest which is forwarded and has not been satisfied by a responsive content object.

18. The computer-readable storage media of claim 17, wherein the instructions further cause the processor to:
allocate the interest limit by transmitting one or more second advertisements to downstream nodes, wherein a second advertisement includes the name and maximum interest information which is an allocated portion of the interest limit, wherein a sum of the allocated portions is equal to the interest limit, and wherein allocating the interest limit is based on one or more of:
an even distribution based on an equal or similar distribution;
an uneven distribution based on network conditions; and
a dynamic or a static distribution.

19. The computer-readable storage media of claim 17, wherein the instructions further cause the processor to:
determine whether the interest limit for the entry is reached;
select an outgoing interface;
in response to determining that the counter for the selected outgoing interface is less than the interest limit:
forward the interest via the selected outgoing interface;
increment by one the counter for the selected outgoing interface; and
in response to determining that the counter for the selected outgoing interface is not less than the interest limit, refrain from forwarding the interest via the selected outgoing interface.

20. The computer-readable storage media of claim 17, wherein the maximum interest information included in the interest is a maximum rate of interests to be forwarded based on the name prefix.

* * * * *